Feb. 9, 1937.   A. CLAUDE ET AL   2,070,510
MECHANICAL AMPLIFYING AND REDUCING SPEED TRANSFORMER
Filed July 25, 1935   3 Sheets-Sheet 3

INVENTORS:
André Claude
and William Nenet
BY
ATTORNEY

Patented Feb. 9, 1937

2,070,510

UNITED STATES PATENT OFFICE 2,070,510

MECHANICAL AMPLIFYING AND REDUCING SPEED TRANSFORMER

André Claude, Paris, and William Manet, Boulogne sur Seine, France, assignors to Société A. Georges Claude, Manet & Cie, a corporation of France Application July 25, 1935, Serial No. 33,158
In Germany August 6, 1934

15 Claims. (Cl. 74—112)

The subject of the present invention is a mechanical amplifying and reducing speed transmission of variable scale.

The device in question is mainly composed of a hub carrying concentrically to its axis and equidistant a certain number of pawls hinged at their base, which are shaped and disposed in such a manner that their end may engage with the teeth of a cap or drum forming a case and constituting the driven member.

This case and this hub roll on the same bearings but their respective bearings are not concentric.

The bearing of the case is concentric with the general axis of the apparatus while the bearing of the hub is eccentric and behind relatively to the bearing of the case.

By reason of the said eccentricity the points of the pawls obviously present themselves to the teeth of the case with different spacings. These spacings pass from maximum to minimum in passing through all the intermediate spacings.

By successively bringing into engagement the end of the pawls with the teeth of the case and only during their passage through a predetermined sector, it will be understood that this case is driven by each pawl through an amount equal to the angular spacing provided between each pawl and the succeeding one, at the moment of their passage through the sector in question, and that it suffices to displace this sector between the two extreme spacings for obtaining the desired transformation of speed.

The sector in question is materialized by a cam which is located in the guiding path provided in a disc constituting the drive and in which slide pins which carry the pawls, thus preventing these from contacting with the teeth outside this sector of use. By turning this disc by means of a suitable mechanism the cam is displaced for bringing it into the selected position.

The foregoing constitutes one of the principal features of this invention.

Another feature consists in having the axis of the eccentric case stationary relatively to the axis of the pawl-carrying hub. This eccentricity is produced by two bearings of eccentric shape assembled and mounted in and fixed by a member in the form of a strap which passes from one side of the apparatus to the other while externally embracing the driven element and attached to a fixed point of the machine on which the change speed gear is mounted.

Each of the said bearings is provided with two tracks, one for the case and the other for the hub. These two tracks are arranged eccentrically relatively to one another by an amount sufficient to obtain the desired result.

In order that the invention may be more clearly understood reference will now be made to the accompanying drawings which show by way of example a preferred embodiment thereof as applied to the pedal of a bicycle.

In the drawings:—

In the drawings like references designate the same or similar parts.

Figure 1:
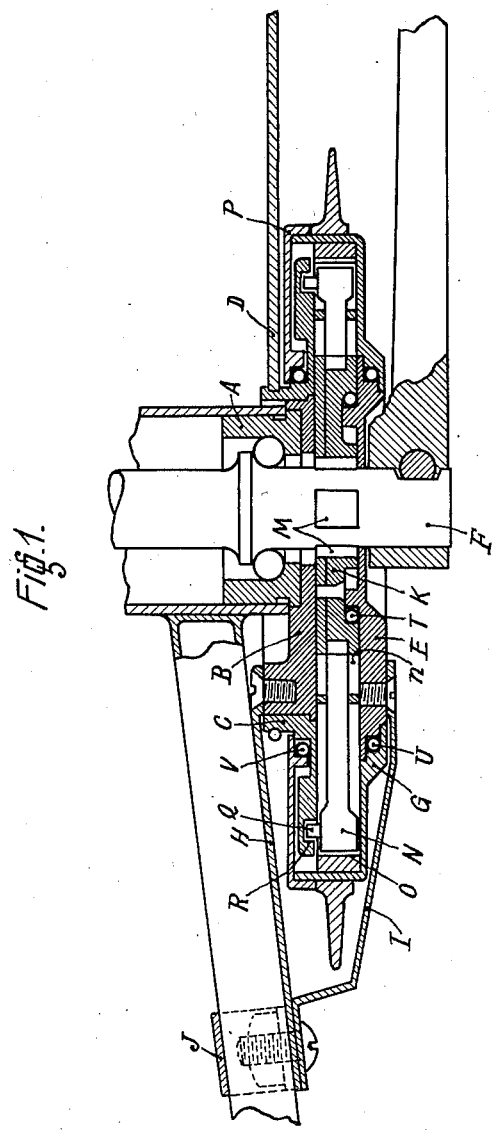
Figure 1 is an axial longitudinal section.

On the projecting part of the cap A of the pedal shaft (Figure 1) is fitted one of the eccentric bearings B. On this latter is mounted with slight friction the cam-carrying disc C which is connected to an operating handle, (not shown) on the frame or handle-bar of the bicycle by an actuating device such as a cable D. On the opposite face is shown the second eccentric bearing E provided with a bore for the pedal shaft F. It is also provided with two ball bearings of which one T is interposed between a member secured to the pedal shaft and the bearing, while the other U supports one of the plates of the case G.

Between the other plate of the case and the cam-carrying disc G is located another ball bearing V.

The two bearings B and E are secured and locked by a strap formed by the two members H and I which themselves are assembled and secured to the frame by the collar J.

Figure 2:
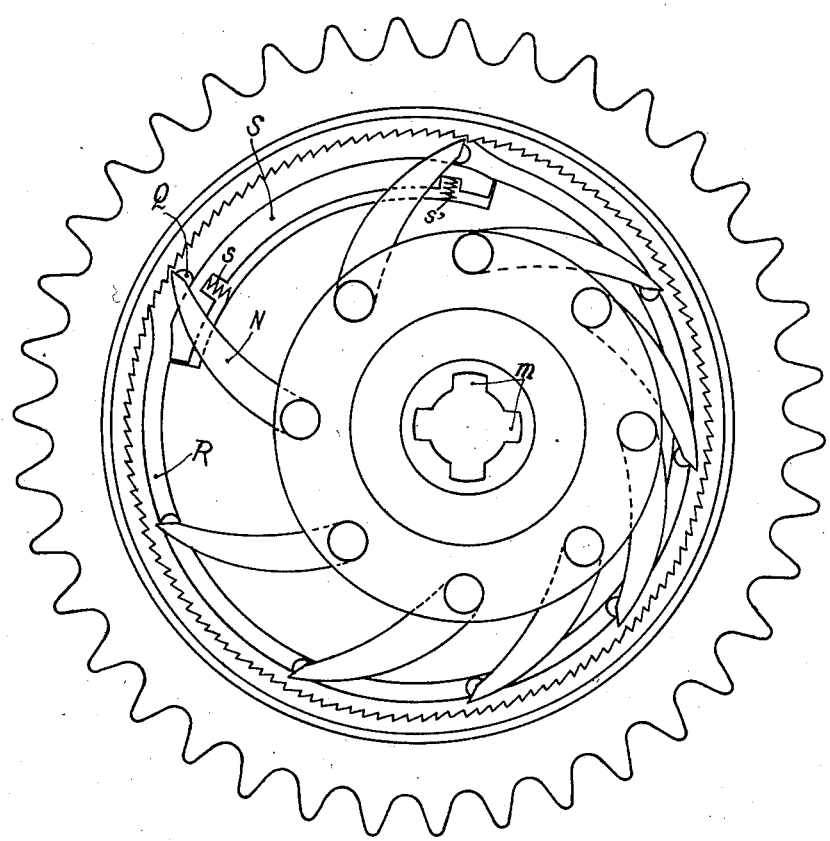
Figure 2 is a front view of the internal mechanism, the cover and the outer bearing being removed.

The pawl-carrying hub K is driven by the pedal shaft F by means of splines M (Figure 1) and m (Figure 2). The pawls N are hinged at their base on pivots n and their end engages with the teeth O of the case G closed by the cover P. Each pawl carries on one side and near the point thereof a pin Q. These pins slide in guide tracks R.

In Figure 2 is shown the guide track R provided with its cam S. The latter, acted upon by springs s and s' engages and holds the points of the pawls in the teeth of the case.

By the angular movement of this cam relatively to the fixed position of the eccentric bearings supporting the case there are obtained the different speed ratios under the conditions and for the reasons explained above.

Figure 3:
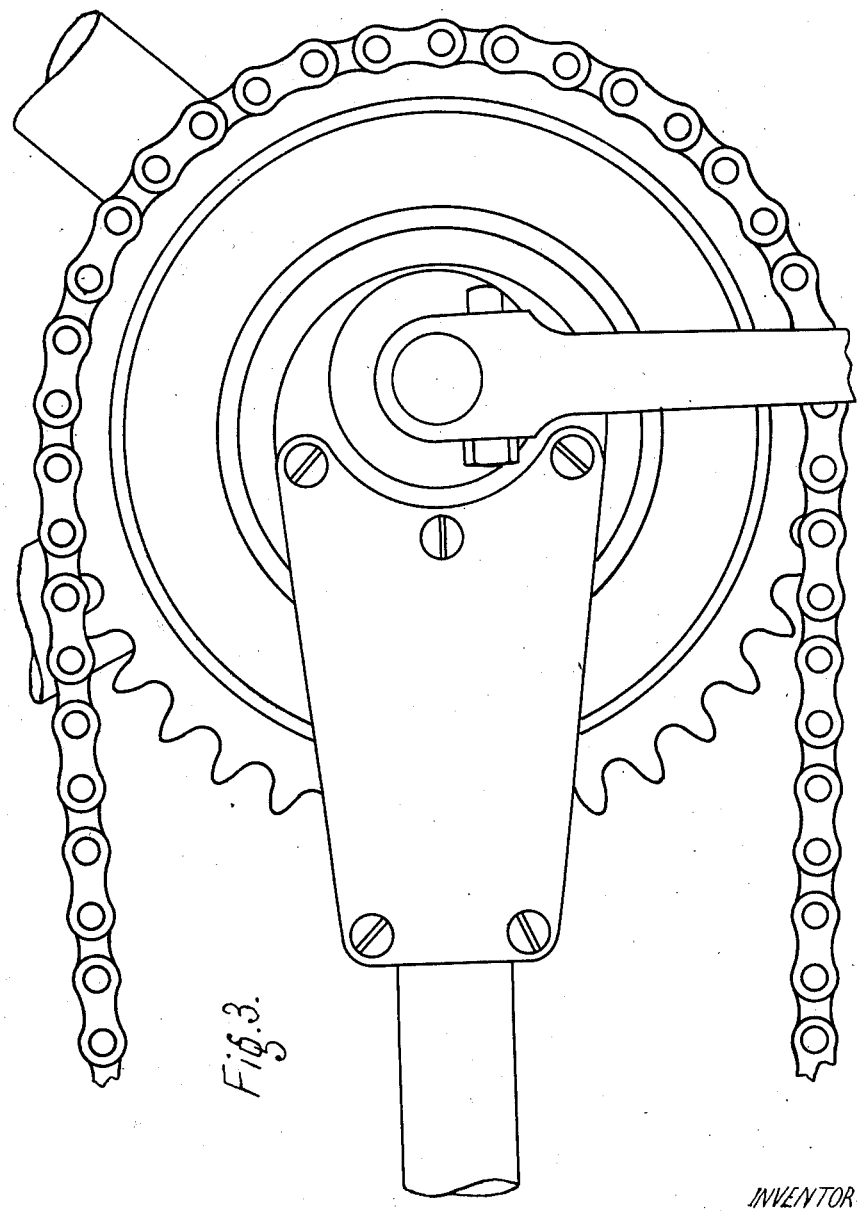
Figure 3 is a view of the external assembly.

Figure 3 is an assembly showing the sprocket for transmitting the movement to the driving wheel of the bicycle, and the fixing of the strap to a tube of the framework.

It will be seen from the above description that the force received by the sprocket is applied to the receiving teeth by the points of the pawls and that the reaction of this force is supported by the stationary eccentrics without any transmission of this reaction to any movable part of the device and in particular to those of the drive. This may therefore be of great smoothness and consequently is not provided with any serious locking device. This is a certain advantage which cannot be the case with a system provided with a movable eccentric or eccentrics where the reaction, always equal to the action, is totally supported by the operating members, as experience has shown that it is practically impossible to destroy the effects of this reaction which always tends to move the drive in a given direction, stretches the cables or any other means for connecting the apparatus to the operating handle, requires a considerable force for manipulation or is very de-multiplied, therefore not very convenient, etc.

With the exception of the cam which has a slight alternative movement under the action of coming into engagement, on the useful sector, with the points of the pawls, which turn for doing this, through a purely circular movement through a small amount, it will be observed that in this device there is no straight line movement either for the drive or for the movements. This is the consequence of the use of a stationary eccentric and naturally assists in obtaining a good efficiency.

Another consequence of the particular conception of this apparatus is a fluid-tightness obtained normally by construction, permitting of effective lubrication of all the members and the exclusion of destructive agents, such as water and dirt.

What we claim is:—

1. A variable speed transmission comprising a driving hub mounted for rotation about a fixed axis, a plurality of pawls pivotally mounted adjacent the periphery thereof, a drum surrounding said driving hub and mounted for rotation about a fixed axis eccentric to the axis of said hub, means for maintaining the free ends of said pawls in spaced relation to said drum during the major portion of a revolution of said hub, and means movable about an axis concentric with the axis of the drum for shifting the free ends of said pawls into driving engagement with said drum during the remaining portion of the revolution of said hub.

2. A variable speed transmission comprising a driving hub mounted for rotation about a fixed axis, a plurality of pawls pivotally mounted adjacent the periphery thereof, a drum surrounding said driving hub and mounted for rotation about a fixed axis eccentric to the axis of said hub, means for maintaining the free ends of said pawls in spaced relation to said drum during the major portion of a revolution of said hub, means movable about an axis concentric with the axis of the drum for shifting the free ends of said pawls into driving engagement with said drum during the remaining portion of the revolution of said hub, and means for moving the shifting means to variable positions about its axis.

3. A variable speed transmission comprising a driving member mounted for rotation about a fixed axis, an annular driven member surrounding the driving member and mounted for rotation about a fixed axis eccentric to the axis of the driving member, a plurality of pawls carried by and circumferentially spaced about the driving member with their free ends projecting beyond the periphery of the driving member, and an arcuate cam sector concentric with the driven member for shifting the free ends of the pawls into driving engagement with the driven member as the pawls pass over said sector during rotation of the driving member.

4. A variable speed transmission comprising a driving member mounted for rotation about a fixed axis, an annular driven member surrounding the driving member and mounted for rotation about a fixed axis eccentric to the axis of the driving member, a plurality of pawls carried by and circumferentially spaced about the driving member with their free ends projecting beyond the periphery of the driving member, an arcuate cam sector concentric with the driven member for shifting the free ends of the pawls into driving engagement with the driven member as the pawls pass over said sector during rotation of the driving member, and means for varying the angular position of said cam sector about the axis of said driven member.

5. A variable speed transmission comprising a driving member mounted for rotation about a fixed axis, an annular driven member surrounding the driving member and mounted for rotation about a fixed axis eccentric to the axis of the driving member, a plurality of pawls carried by and circumferentially spaced about the driving member with their free ends projecting beyond the periphery of the driving member, a plurality of teeth on the inner face of said annular driven member, and an arcuate cam sector concentric with the driven member for shifting the free ends of the pawls into driving engagement with the teeth of the driven member as the pawls pass over said sector during rotation of the driving member.

6. A variable speed transmission comprising a driving member mounted for rotation about a fixed axis, an annular driven member surrounding the driving member and mounted for rotation about a fixed axis eccentric to the axis of the driving member, a plurality of pawls carried by and circumferentially spaced about the driving member with their free ends projecting beyond the periphery of the driving member, a plurality of teeth on the inner face of said annular driven member, an arcuate cam sector concentric with the driven member for shifting the free ends of the pawls into driving engagement with the teeth of the driven member as the pawls pass over said sector during rotation of the driving member, and yielding means for radially urging said cam sector toward the inner face of said driven member.

7. A variable speed transmission comprising a driving shaft, bearings for supporting said shaft, a driven member eccentrically carried by said bearings, means for locking and securing said bearings against displacement about the axis of said shaft, said driven member having an annular portion provided with spaced teeth on the inner face thereof, a driving member affixed to said shaft, a plurality of pawls carried by the driving member and projecting beyond the periphery thereof, and a sector cam concentric with the axis of the driven member for shifting the free ends of the pawls into driving engagement with the teeth on the driven member as said pawls pass over said cam.

8. A variable speed transmission comprising a driving shaft, bearings for supporting said shaft, a driven member eccentrically carried by said bearings, means for locking and securing said bearings against displacement about the axis of said shaft, said driven member having an annular portion provided with spaced teeth on the inner face thereof, a driving member affixed to said shaft, a plurality of pawls carried by the driving member and projecting beyond the periphery thereof, a sector cam concentric with the axis of the driven member for shifting the free ends of the pawls into driving engagement with the teeth on the driven member as said pawls pass over said cam, and means for adjusting the angular position of said sector cam about the axis of said driven member.

9. A variable speed transmission comprising a driving shaft, bearings for supporting said shaft, a driven member eccentrically carried by said bearings, means for locking and securing said bearings against displacement about the axis of to said shaft, said driven member having an annular portion provided with spaced teeth on the inner face thereof, a driving member affixed to said shaft, a plurality of pawls carried by the driving member and projecting beyond the periphery thereof, and means including a sector cam concentric with the axis of the driven member for resiliently urging the pawls into driving engagement with the teeth on the driven member as the pawls pass over said cam.

10. A variable speed transmission comprising a driving shaft, bearings for supporting said shaft, a driven member eccentrically carried by said bearings, means for locking and securing said bearings against displacement about the axis of to said shaft, said driven member having an annular portion provided with spaced teeth on the inner face thereof, a driving member affixed to said shaft, a plurality of pawls carried by the driving member and projecting beyond the periphery thereof, means including a sector cam concentric with the axis of the driven member for resiliently urging the pawls into driving engagement with the teeth on the driven member as the pawls pass over said cam, and means for adjusting the angular position of said sector cam about the axis of said driven member.

11. A variable speed transmission for bicycles, comprising a crank shaft, a bearing for supporting said shaft in the frame of the bicycle, a circular disc eccentrically mounted on the crank shaft bearing, means for securing said disc to the frame against rotation, an annular disc having a lateral flange at its inner periphery rotatably supported on the periphery of the eccentrically mounted disc, a drum-like driven member rotatably mounted on the circumference of said lateral flange, teeth on the inner face of said driven member, a driving member carried by said shaft, a plurality of pawls carried by said driving member, and a sector cam carried by the annular disc and concentric with the axis of said driven member for urging the pawls into driving engagement with the teeth of the driven member.

12. A variable speed transmission for bicycles, comprising a crank shaft, a bearing for supporting said shaft in the frame of the bicycle, a circular disc eccentrically mounted on the crank shaft bearing, means for securing said disc to the frame against rotation, an annular disc having a lateral flange at its inner periphery rotatably supported on the periphery of the eccentrically mounted disc, a drum-like driven member rotatably mounted on the circumference of said lateral flange, teeth on the inner face of said driven member, a driving member carried by said shaft, a plurality of pawls carried by said driving member, a sector cam carried by the annular disc and concentric with the axis of said driven member for urging the pawls into driving engagement with the teeth of the driven member, and means for rotating the annular disc to vary the angular position of said cam.

13. A variable speed transmission for bicycles, comprising a crank shaft, a bearing for supporting said shaft in the frame of the bicycle, a a circular disc eccentrically mounted on the crank shaft bearing, means for securing said disc to the frame against rotation, an annular disc having a lateral flange at its inner periphery rotatably supported on the periphery of the eccentrically mounted disc, a drum-like driven member rotatably mounted on the circumference of said lateral flange, teeth on the inner face of said driven member, a driving member carried by said shaft, a plurality of pawls carried by said driving member, said annular disc having a circular groove formed in one face thereof concentric with the axis of the driven member, lugs on said pawls positioned in said groove for maintaining said pawls out of engagement with said teeth, said groove having a sector opening radially outwardly and a cam positioned adjacent said opening for urging said lugs out of the groove and the pawls into engagement with said teeth.

14. A variable speed transmission for bicycles, comprising a crank shaft, a bearing for supporting said shaft in the frame of the bicycle, a circular disc eccentrically mounted on the crank shaft bearing, means for securing said disc to the frame against rotation, an annular disc having a lateral flange at its inner periphery rotatably supported on the periphery of the eccentrically mounted disc, a drum-like driven member rotatably mounted on the circumference of said lateral flange, teeth on the inner face of said driven member, a driving member carried by said shaft, a plurality of pawls carried by said driving member, said annular disc having a circular groove formed in one face thereof concentric with the axis of the driven member, lugs on said pawls positioned in said groove for maintaining said pawls out of engagement with said teeth, said groove having a sector opening radially outwardly, a cam positioned adjacent said opening for urging said lugs out of the groove and the pawls into engagement with said teeth, and resilient means urging said cam radially outwardly.

15. A variable speed transmission for bicycles, comprising a crank shaft, a bearing for supporting said shaft in the frame of the bicycle, a circular disc eccentrically mounted on the crank shaft bearing, means for securing said disc to the frame against rotation, an annular disc having a lateral flange at its inner periphery rotatably supported on the periphery of the eccentrically mounted disc, a drum-like driven member rotatably mounted on the circumference of said lateral flange, teeth on the inner face of said driven member, a driving member carried by said shaft, a plurality of pawls carried by said driving member, said annular disc having a circular groove formed in one face thereof concentric with the axis of the driven member, lugs on said pawls positioned in said groove for maintaining said pawls out of engagement with said teeth, said groove having a sector opening radially outwardly, a cam positioned adjacent said opening for urging said lugs out of the groove and the pawls into engagement with said teeth, resilient means urging said cam radiallly outwardly, and means for rotating the annular disc to vary the angular position of said cam.

ANDRE CLAUDE.
WILLIAM MANET.